United States Patent
Cossairt et al.

(10) Patent No.: US 10,614,271 B2
(45) Date of Patent: Apr. 7, 2020

(54) INTERACTIVE SYSTEMS AND METHODS

(71) Applicant: Universal City Studios LLC, Universal City, CA (US)

(72) Inventors: Travis Jon Cossairt, Celebration, FL (US); Wei Cheng Yeh, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 47 days.

(21) Appl. No.: 15/882,738

(22) Filed: Jan. 29, 2018

(65) Prior Publication Data

US 2019/0220634 A1 Jul. 18, 2019

Related U.S. Application Data

(60) Provisional application No. 62/617,531, filed on Jan. 15, 2018.

(51) Int. Cl.
| | |
|---|---|
| *G06K 7/10* | (2006.01) |
| *G06F 3/041* | (2006.01) |
| *G06F 3/0487* | (2013.01) |
| *G06F 3/01* | (2006.01) |
| *A63F 13/00* | (2014.01) |
| *G06K 19/07* | (2006.01) |
| *A63G 31/00* | (2006.01) |

(52) U.S. Cl.
CPC .......... *G06K 7/10366* (2013.01); *A63F 13/00* (2013.01); *A63G 31/00* (2013.01); *G06F 3/011* (2013.01); *G06F 3/041* (2013.01); *G06F 3/0487* (2013.01); *G06K 7/10009* (2013.01); *G06K 7/10346* (2013.01); *G06K 19/0723* (2013.01)

(58) Field of Classification Search
USPC ........................................................ 235/451
See application file for complete search history.

(56) References Cited

U.S. PATENT DOCUMENTS

| | | | |
|---|---|---|---|
| 5,946,444 A | 8/1999 | Evans et al. | |
| 6,142,368 A | 11/2000 | Mullins et al. | |
| 6,307,952 B1 | 10/2001 | Dietz | |

(Continued)

FOREIGN PATENT DOCUMENTS

| | | | |
|---|---|---|---|
| JP | 2003288472 A | 10/2003 | |
| JP | 2004126791 A | 4/2004 | |

(Continued)

OTHER PUBLICATIONS

U.S. Appl. No. 15/882,761, filed Jan. 29, 2018, Wei Cheng Yeh.

(Continued)

*Primary Examiner* — Rafferty D Kelly
(74) *Attorney, Agent, or Firm* — Fletcher Yoder, P.C.

(57) ABSTRACT

In one embodiment, a system includes a radio-frequency identification (RFID) reader configured to read data stored on an RFID tag associated with a user and to generate a first signal indicative of the data and indicative of a location of the RFID tag, a sensor system configured to detect a user interaction with an interactive element and to generate a second signal indicative of the user interaction, and a processor configured to match the user to the user interaction based on the first signal and the second signal and to update a user database to reflect that the user is matched to the user interaction.

20 Claims, 4 Drawing Sheets

(56) References Cited

U.S. PATENT DOCUMENTS

| | | |
|---|---|---|
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 8,981,907 B1 | 3/2015 | Lavache |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,148,202 B2 | 9/2015 | Ackley et al. |
| 9,149,717 B2 | 10/2015 | Barney et al. |
| 9,162,148 B2 | 10/2015 | Barney et al. |

(56) References Cited

U.S. PATENT DOCUMENTS

| | | |
|---|---|---|
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 1,001,079 A1 | 7/2018 | Weston et al. |
| 1,002,262 A1 | 7/2018 | Barney et al. |
| 2002/0008622 A1 | 1/2002 | Weston et al. |
| 2004/0008114 A1 | 1/2004 | Sawyer |
| 2005/0143133 A1 | 6/2005 | Bridgelall |
| 2006/0125638 A1 | 6/2006 | Marino |
| 2010/0164723 A1 | 7/2010 | Shiau et al. |
| 2010/0207738 A1 | 8/2010 | Bloy |
| 2011/0193958 A1 | 8/2011 | Martin et al. |
| 2012/0276921 A1 | 11/2012 | Németh |
| 2012/0286938 A1 | 11/2012 | Cote et al. |
| 2013/0147609 A1 | 6/2013 | Griffin et al. |
| 2013/0324059 A1 | 12/2013 | Lee et al. |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0347792 A1 | 12/2015 | Bucherer-Klingler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1* | 6/2017 | Heaven .............. H04W 4/021 |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0008897 A1 | 1/2018 | Ackley et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |

FOREIGN PATENT DOCUMENTS

| | | |
|---|---|---|
| JP | 2005267179 A | 9/2005 |
| JP | 2010000178 A | 1/2010 |
| JP | 2012244846 A | 12/2012 |
| JP | 2013188019 A | 9/2013 |

(56) References Cited

FOREIGN PATENT DOCUMENTS

| JP | 6152919 B1 | 6/2017 |
|----|------------|--------|
| WO | 2014135213 | 9/2014 |

OTHER PUBLICATIONS

U.S. Appl. No. 15/882,721, filed Jan. 29, 2018, Wei Cheng Yeh.
U.S. Appl. No. 15/882,788, filed Jan. 29, 2018, Wei Cheng Yeh.
U.S. Appl. No. 15/972,940, filed May 7, 2018, Unavailable.
U.S. Appl. No. 15/995,633, filed Jun. 1, 2018, Unavailable.
U.S. Appl. No. 16/196,967, filed Nov. 20, 2018, Matthew Usi.
U.S. Appl. No. 15/826,357, filed Nov. 29, 2017, Wei Yeh.
U.S. Appl. No. 15/833,839, filed Dec. 6, 2017, Travis Jon Cossairt.
U.S. Appl. No. 15/861,502, filed Jan. 3, 2018, Wei Cheng Yeh.
U.S. Appl. No. 15/874,671, filed Jan. 18, 2018, Wei Cheng Yeh.
Yimin Zhang et al.; "Localization and Tracking of Passive RFID Tags Based on Direction Estimation", International Journal of Antennas and Propagation, 2007, pp. 1-9, vol. 2007, Hindawi Publishing Corporation.
PCT/US2018/061353 Invitation to Pay Additional Fees dated Feb. 14, 2019.

\* cited by examiner

INTERACTIVE SYSTEMS AND METHODS

CROSS-REFERENCE TO RELATED APPLICATION

This application claims priority from and the benefit of U.S. Provisional Application No. 62/617,531, entitled "INTERACTIVE SYSTEMS AND METHODS," filed Jan. 15, 2018, which is hereby incorporated by reference in its entirety for all purposes.

FIELD OF DISCLOSURE

The present disclosure relates generally to amusement parks. More specifically, embodiments of the present disclosure relate to interactive systems and methods for use in amusement parks.

BACKGROUND

Amusement parks and/or theme parks may include various entertainment attractions. Some existing attractions may provide guests with an immersive or interactive experience. For example, guests may visit areas having various features, such as audio, video, and special effects features. With the increasing sophistication and complexity of modern attractions, and the corresponding increase in expectations among amusement park and/or theme park guests, improved and more creative attractions are needed, including attractions that provide a more interactive and personalized experience.

SUMMARY

In one embodiment, a system includes a radio-frequency identification (RFID) reader configured to read data stored on an RFID tag associated with a user and to generate a first signal indicative of the data and indicative of a location of the RFID tag, a sensor system configured to detect a user interaction with an interactive element and to generate a second signal indicative of the user interaction, and a processor configured to match the user to the user interaction based on the first signal and the second signal and to update a user database to reflect that the user is matched to the user interaction.

In one embodiment, a system includes a radio-frequency identification device (RFID) reader configured to read data stored on RFID tags associated with respective users, a sensor system configured to detect a first user interaction at a first portion of a display and a second user interaction at a second portion of the display, and a processor configured to receive RFID signals indicative of the data from the RFID reader and to receive sensor signals indicative of the first user interaction and the second user interaction from the sensor system. The processor is configured to render a first image for display at the first portion of the display and to render a second image for display at the second portion of the display based on the RFID signals and the sensor signals.

In one embodiment, a method includes receiving, at a processor, a first signal from an RFID reader, then receiving, at the processor, a second signal from a sensor system. The first signal is indicative of data stored on an RFID tag and indicative of a location of the RFID tag associated with a user and read by the RFID reader and the second signal is indicative of a user interaction with an interactive element. The method also includes matching, using the processor, the user to the user interaction based on the first signal and the second signal, and finally updating, using the processor, a user database to reflect that the user is matched to the user interaction.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. The different types of entertainment may include features that enhance a guest's experience at the amusement park. However, many of the forms of entertainment do not vary based upon a guest's previous experiences or actions. For example, a game may include the same rules, elements, and gameplay for each guest. Some guests may prefer a more interactive form of entertainment that is different for each guest and/or different during each interaction. As such, there may be a need to create an interactive system that detects a guest's interaction with an interactive element and/or updates the interactive element based at least in part on the guest's interaction to provide a unique experience.

The present disclosure relates to an interactive system that uses radio-frequency identification (RFID). Users of the interactive system may be guests of an amusement park. A user may wear or carry a device that supports an RFID tag. The interactive system may read the RFID tag and detect the user's interaction with an interactive element. In one embodiment, the interactive system may display different elements depending on the user's interactions with the system. Each user may have had different, respective interactions with the system, and thus, the system may display different interactive elements from user to user. Further, the interactive system may activate a different feature based on an achievement or performance of the user. In this manner, each user's experience with the interactive system may be different and tailored to more suitably fit the corresponding user.

Figure 1:
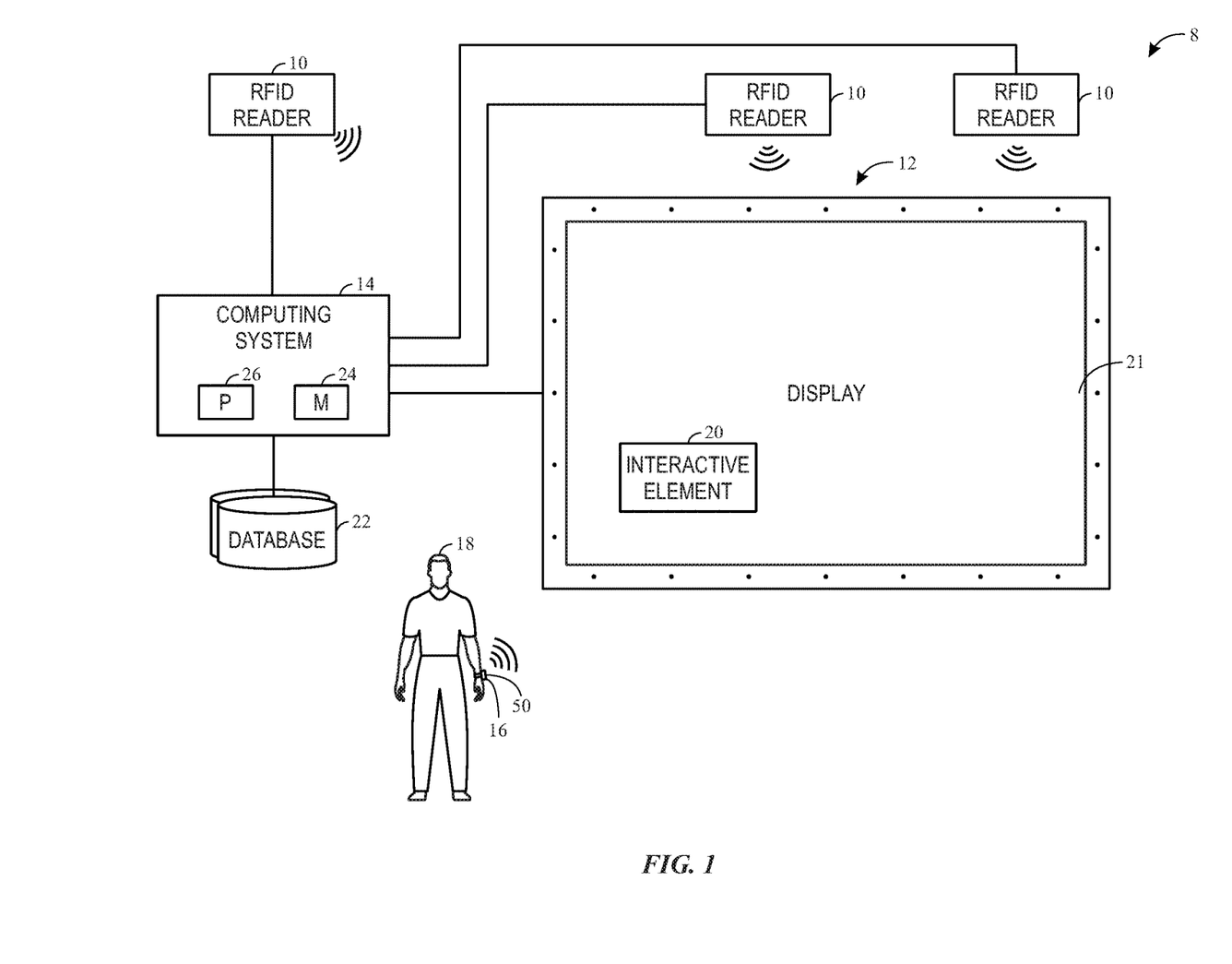
FIG. 1 is a schematic diagram of an interactive system, in accordance with an aspect of the present disclosure.

Turning to the drawings, FIG. 1 is a schematic view of an embodiment of an interactive system 8. In one embodiment, the interactive system 8 may be located in a room or area of an attraction. As illustrated in FIG. 1, the interactive system 8 includes RFID readers 10, a sensor system 12, and a computing system 14 (e.g., a cloud-based computing system). Each RFID reader 10 may read an RFID tag 50 supported by a wearable device 16 (e.g., wearable or portable device, such as a bracelet, necklace, charm, pin, or toy), which may be worn or carried by a user 18. In one embodiment, the RFID reader 10 may be a transceiver that may be capable of sending information to the RFID tag 50 and/or to other devices. For example, the RFID reader 10 may send a signal indicative of information received from the RFID tag 50 to the computing system 14, which determines an approximate location of the user 18 based on the signal. In operation, the user 18 may interact with an interactive element 20 (e.g., an object or image) and the interaction may be detected by the sensor system 12. In one embodiment, the interactive element 20 may be an image (e.g., visual or graphical element) displayed on a display 21 (e.g., screen or wall). When the user 18 interacts with the interactive element 20, the sensor system 12 may detect the action performed and send a signal indicative of the action to the computing system 14. In response to the received signals, the computing system 14 may update information regarding the user 18 (e.g., assign points, update a level, mark tasks as complete) and/or change the interactive element 20. The computing system 14 may include one or more databases 22, a memory 24 that contains instructions regarding updating the interactive elements 20 and the one or more databases 22, and one or more processors 26 that execute the instructions. The memory 24 includes non-transitory, computer-readable medium that may store the instructions.

Figure 2:
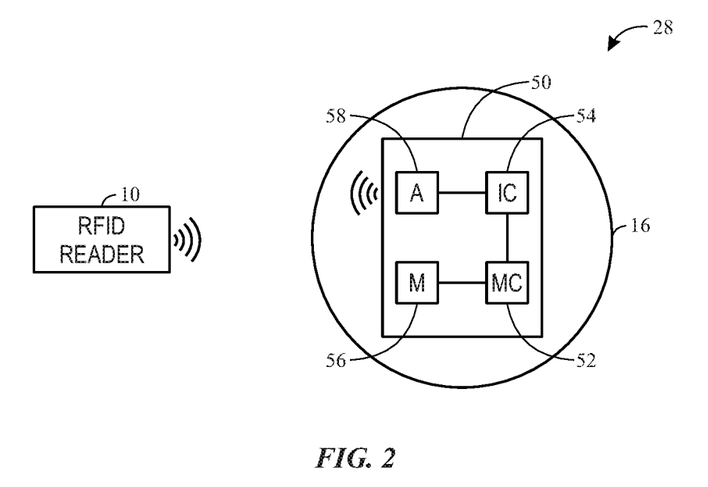
FIG. 2 is a schematic diagram of a radio-frequency identification (RFID) system that may be used in the interactive system of FIG. 1, in accordance with an aspect of the present disclosure.

FIG. 2 illustrates a schematic of an RFID system 28 that may be used in the interactive system 8. The RFID system 28 contains the RFID reader 10 and the RFID tag 50. The RFID reader 10 may obtain information by reading the RFID tag 50 of the wearable device 16 associated with the user 18. The RFID tag 50 may include a microchip 52, an integrated circuit 54 to power the microchip 52, a memory 56 storing information, and an antenna 58 that may transmit and receive signals. The RFID reader 10 continuously sends out signals in electromagnetic waves. In one embodiment, the RFID reader 10 and the RFID tag 50 use ultra-high frequency (UHF) waves, which may range from about 300 MHz to 3 GHz. It should be appreciated that the RFID reader 10 may emit waves having any suitable frequency. Furthermore, in some embodiments, the RFID tag 50 may additionally or alternatively use near-field communication (NFC) (e.g., the RFID tag 50 may be a dual-frequency RFID tag) and may be read by an NFC reader. When the wearable device 16 is within a certain distance of the RFID reader 10 (e.g., about 10 or 20 feet), the antenna 58 of the RFID tag 50 captures the emitted electromagnetic waves as energy. The integrated circuit 54 uses the energy to provide power to the microchip 52, which generates backscatter. The backscatter is a signal containing information stored in the memory 56 of the RFID tag 50. The RFID tag 50 transmits the backscatter to RFID reader 10 via the antenna 58, where the RFID reader 10 interprets the backscatter to obtain the information. The RFID reader 10 may send a signal to the computing system 14 indicative of the backscatter obtained from the RFID tag 50. The computing system 14 may use the information to change the interactive elements 20 of the interactive system 8. Furthermore, the RFID reader 10 may be able to detect the strength of the backscatter sent by the RFID tag 50, and as a result, the computing system 14 may determine the approximate location of the RFID tag 50 and thus, the user 18. In one embodiment, multiple RFID readers 10 may be used in the interactive system 8 to determine (e.g., via triangulation) the location of the user 18 more efficiently and/or accurately based on the respective strength of the received backscatters.

The wearable device 16 may be compatible with multiple RFID readers 10 disposed in multiple interactive systems 8 and may be reused for several visits to the park. In operation, when the RFID reader 10 receives the signal from the RFID tag 50, the RFID reader 10 may identify the wearable device 16 and the computing system 14 may access corresponding information from the one or more databases 22. The corresponding information in the one or more databases 22 may include the user's identity, preferences, level in the game, completed tasks or actions, team affiliation, or any of a variety of other information related to the user 18, the wearable device 16, and/or past interactions with one or more interactive systems 8. In this manner, the user 18 may build upon prior performances and experiences. The one or more databases 22 may also include stored media (e.g., in a model or media database) that may be rendered, such as on the display 21. In one embodiment, data may be transferred between the memory 56 and a remote computing system (e.g., a gaming console). For example, data indicative of achievements on the remote computing system may be written to and stored in the memory 56. The RFID reader 10 may then read the data in the memory 56, and the computing system 14 may adjust the gameplay based on the data (e.g., generating new interactive elements 20 on the display 21).

Turning back to FIG. 1, the sensor system 12 and the RFID system 28 (FIG. 2) may work in conjunction to determine both an occurrence of an interaction and who caused the interaction. For example, the user 18 may interact with the interactive element 20 (e.g., touch the interactive element 20, which may be an image on the display 21). The sensor system 12 may detect that the interaction with interactive element 20 has occurred and send a signal to the computing system 14. The signal generated by the sensor system 12 may indicate or provide information related to the occurrence of the interaction and/or the location of the interaction relative to the sensor system 12 and relative to the interactive element 20. However, the sensor system 12 cannot detect the identity of the user 18 nor determine which user 18 interacted with the interactive element 20. As noted above, the RFID system 28 may determine the identification of the user 18 based on received backscatter from the RFID tag 50 of the user 18. The RFID system 28 may also determine an approximate location of the user 18 based on the strength of the received backscatter. The RFID system 28 may send information related to the identification and the approximate location to the computing system 14. The computing system 14 can then use information regarding the occurrence of the interaction, the location of interaction, the identification of the user 18, and the location of the user 18 to determine which user 18 interacted with the interactive element 20. As a result of determining that the user 18 interacted with the interactive element 20, the computing system 14 may update information regarding the user 18 (e.g., assign points) to reflect the interaction. Thus, together the sensor system 12 and the RFID system 28 provide a system that efficiently tracks the interactions of each user 18 within an attraction.

In one embodiment, the processor 26 of the computing system 14 may determine the identification of the RFID tag 50 supported in the wearable device 16 worn or carried by the user 18. In one embodiment, the databases 22 may contain corresponding information for the RFID tag 50, which may be associated with the user 18. For example, when the user 18 obtains the wearable device 16, the user 18 may register the wearable device 16 to associate the wearable device 16 with the user 18 and/or to input (e.g., via a user's computing device, such as a mobile phone, that is communicatively coupled to the computing system 14) any user information and/or preferences, such as the user's name, age, physical attributes and/or limits, preferred difficulty level, preferred characters, preferred types of games, preferred team affiliation, preferred theme, or the like, which may be stored as the corresponding information for the RFID tag 50 within the databases 22. As the user 18 interacts with the interactive system 8, the corresponding information for the RFID tag 50 stored within the databases 22 may be updated to include completed interactions, achievements, level in the game, or the like.

It should be appreciated that the databases 22 may contain corresponding information for multiple RFID tags 50, which may each be supported in a respective wearable device 16 that is worn or carried by a respective user 18. In one embodiment, upon determining the identification of the RFID tag 50, the processor 26 may access the corresponding information (e.g., corresponding to or associated with the RFID tag 50 of the wearable device 16) in the database 22. As noted above, the databases 22 may be in communication with multiple computing systems 14, which may be coupled to separate interactive systems 8.

As noted above, the signal received at the computing system 14 from the RFID reader 10 may provide information regarding the location of the user 18. For example, the signal from the RFID reader 10 may indicate detection of the backscatter from the RFID tag 50 and/or the strength of the backscatter received from the RFID tag 50, which in turn may indicate the approximate location of the wearable device 16, and thus, the corresponding user 18. For example, the RFID reader 10 may only read RFID tags 10 that are within a certain range or distance of the RFID reader 10. Accordingly, detection of the backscatter by the RFID reader 10 indicates that the RFID tag 50 of the wearable device 16 is within the certain range or distance of the RFID reader 10.

In operation, the computing system 14 may also receive a signal from the sensor system 12. The signal may indicate the occurrence of an interaction with the interactive element 20. In the illustrated embodiment, the interactive element 20 is an image presented on the display 21. In one embodiment, the processor 26 may process the signal from the sensor system 12 to detect the interaction with the interactive element 20. For example, in some embodiments, the processor 26 may process the signal from the sensor system 12 to determine a location of the interaction relative to the interactive element 20 to determine if an interaction with the interactive element 20 occurred. For example, the interactive element 20 may be an image located in a corner of the display 21. When the sensor system 12 senses an action (e.g., a touch, swipe, movement) performed in the corner of the display 21 at or proximate to the location of the interactive element 20, the processor 26 may determine that an interaction with the interactive element 20 has occurred. Therefore, the processor 26 may process the signal received from the sensor system 12 to determine the occurrence of an interaction and/or the location of the interaction.

In one embodiment, the processor 26 may also receive and process the signal from the RFID reader 10 to determine the identity of the RFID tag 50 associated with the user 18 who performed the interaction with the interactive element 20. It should be appreciated that the signal from the RFID reader 10 may indicate the strength of the backscatter and/or multiple RFID readers 10 may be utilized to facilitate determination of the location of the RFID tag 50 associated with the user 18. Determining the location of the RFID tag 50 may facilitate matching the user 18 to the interaction with the interactive element 20, particularly where multiple users 18, each having a respective wearable device 16 with a respective RFID tag 50, are proximate to one another or in the range of the RFID tag 50.

In response to the determination that the user 18 completed the interaction with the interactive element 20, the processor 26 may send a signal to update one or more interactive elements 20. For example, in response to the processor 26 determining that the user 18 touched the interactive element 20, the processor 26 may transmit a signal that causes the interactive element 20 to disappear and be replaced by a new interactive element 20 (e.g., the processor 26 may render an image based on relevant information from one or more databases 22 for display on the display 21). In one embodiment, the computing system 14 may render and/or instruct display of the new interactive element 20 based on the identity of the RFID tag 50 and/or the corresponding information accessed from the databases 22. For example, the computing system 14 may access the corresponding information in the databases 22 that indicates that the RFID tag 50 is affiliated with a particular team, and then the computing system 14 may render and/or instruct display of an animated character that is associated with the particular team. Additionally or alternatively, the computing system 14 may render and/or play audio. Thus, the computing system 14 may render different types of media (e.g., audio, images) in response to detection of an interaction with the interactive element 20. Moreover, in one embodiment, the processor 26 may update the databases 22 to reflect the interaction with the interactive element 20. For example, in response to the processor 26 determining that the user 18 interacted with the interactive element 20, the processor 26 may transmit a signal to the databases 22 to update the corresponding information (e.g., points earned by the user 18 from interacting with interactive element 20, level in the game, interactions completed) for the RFID tag 50 supported in the wearable device 16 that is worn or carried by the user 18. In this manner, the processor 26 may process the combination of the signals sent by the sensor system 12 and the RFID reader 10 to update the interactive elements 20 and/or the databases 22.

In one embodiment, the RFID system 28 may update the information of multiple users 18 simultaneously. For example, the RFID reader 10 may determine that multiple users 18 are located within a zone (e.g., a predetermined zone) proximate to the interactive element 20. Then, when one of the users 18 interacts with the interactive element 20, the computing system 14 may update information of all of the users 18 that are located within the zone proximate to the interactive element 20.

When the user 18 reaches a certain achievement (e.g., accumulating enough points from interactions or completing certain interactions), the computing system 14 may process the achievement to enable the user 18 to obtain special items or experiences. In one embodiment, the interactive system 8 may include an isolated room or area that is only accessible to the user 18 after the user 18 has reached a certain achievement. For example, a door of the isolated room or area may be communicatively coupled with the computing system 14, and the computing system 14 may provide a signal to open the door only after the user 18 has reached a certain achievement. In one embodiment, the computing system 14 may provide coupons (e.g., via a printing device or via a mobile device of the user 18) for exclusive merchandise as a result of reaching a certain achievement. It should be appreciated that the computing system 14 may receive and analyze data from the database 22 to determine that a certain achievement has been reached and to perform such actions.

Figure 3:
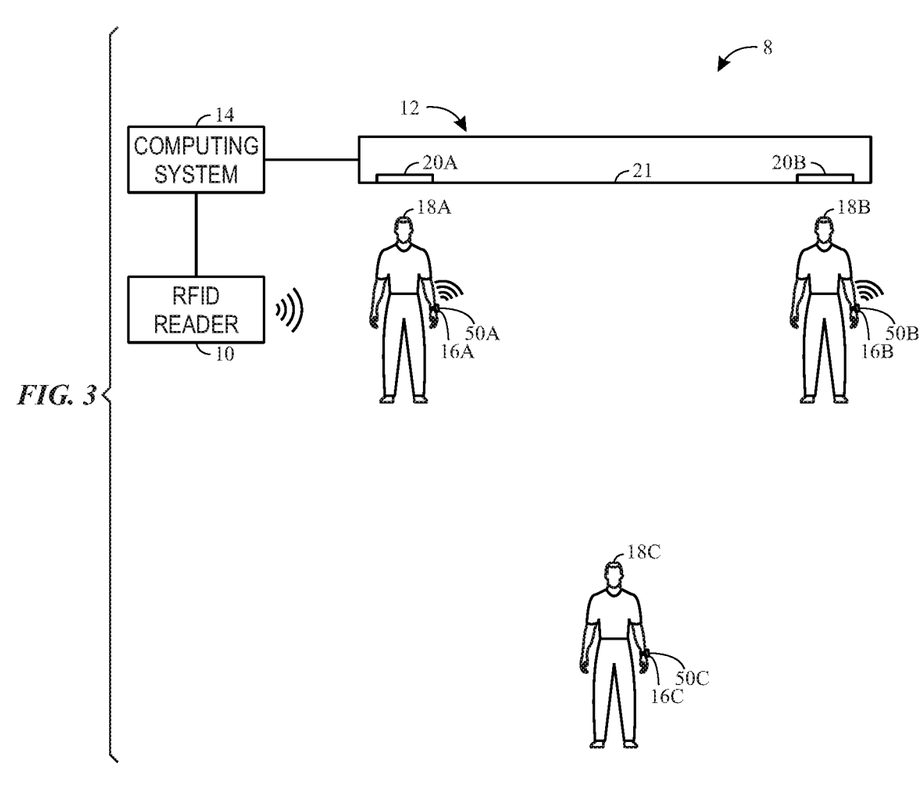
FIG. 3 is a schematic diagram of multiple users interacting with the interactive system of FIG. 1, in accordance with an aspect of the present disclosure.

FIG. 3 illustrates a schematic of an embodiment of the interactive system 8 shown in FIG. 1. FIG. 3 shows the RFID reader 10, the sensor system 12, and the computing system 14. Furthermore, FIG. 3 shows multiple users 18A, 18B, and 18C each with respective wearable devices 16A, 16B, and 16C that support respective RFID tags 50A, 50B, 50C. In FIG. 3, the users 18 are located within the interactive system 8 such that the wearable device 16A is the most proximate, the wearable device 16C is the most distant, and the wearable device 16B is intermediate to the RFID reader 10. As discussed above, the respective RFID tags 50 located on the respective wearable devices 16 send respective backscatter to the RFID reader 10, and the detection of and/or the strength of the backscatter is based on the location of the RFID tags 50 with respect to the RFID reader 10. For example, in FIG. 3, the RFID reader 10 will pick up stronger backscatter from the RFID tag 50A as compared to the RFID tag 50B. In turn, the RFID reader 10 will transmit a signal that contains information indicative of the strength of the respective backscatters to the computing system 14. As a result, the computing system 14 will determine the location of the user 18A is more proximate to the RFID reader 10 than the user 18B. Further, the RFID tag 50C may be outside of the receiving range of RFID reader 10, and thus, the RFID reader 10 may not detect the user 18C nor provide an indication of the presence of the user 18C to the computing system 14. Other RFID readers 10 may be used in conjunction to more specifically identify location information, such as via triangulation.

The sensor system 12 may detect and generate a signal indicative of each interaction with the interactive elements 20. For example, with reference to FIG. 3, when the user 18A interacts with a first interactive element 20A, the sensor system 12 detects and generates a signal indicative of the interaction with the first interactive element 20A. Likewise, when the user 18B interacts with a second interactive element 20B, the sensor system 12 detects and generates a signal indicative of the interaction with the second interactive element 20B. In one embodiment, the first and second interactive elements 20A, 20B may be located on a touchscreen communicatively coupled to the sensor system 12. The users 18A, 18B may touch the respective first and second interactive elements 20A, 20B, and the touchscreen may detect the interactions. As a result, the sensor system 12 sends signals to the computing system 14 indicative of the respective interactions. The computing system 14 receives and processes the signals indicative of the respective interactions with the first and second interactive elements 20A, 20B from the sensor system 12, as well as the signals indicative of the locations of the users 18A, 18B from the RFID reader 10 to match (e.g., assign) the interaction with the first interactive element 20A to the user 18A and the interaction with the second interactive element 20B to the user 18B. For example, the computing system 14 may determine that the user 18A was located most proximate to the first interactive element 20A at the time of the interaction with the first interactive element 20A based on the signals, and thus, the computing system 14 matches the user 18A to the interaction with the first interactive element 20A. In one embodiment, the computing system 14 may update the corresponding information for the users 18A, 18B in the database 22 based on the received signals and the matched interactions.

In one embodiment, the computing system 14 may transmit a signal to update the interactive elements 20 based on the received signals. For example, the computing system 14 may render one new image from a model database of the one or more databases 22 for display on the display 21 in the vicinity of the user 18A, and the computing system 14 may render a different new image from the model database for display on the display 21 in the vicinity of the user 18B. The new image and the different new image may be rendered based at least in part on the corresponding information in the databases 22 for the RFID tags 50A, 50B associated with the users 18A, 18C. In this manner, the interactive system 8 may track performance of each user 18 and/or provide a personalized experience for each user 18. Additionally or alternatively, the computing system 14 may render a different new image from the model database locally and independent of the information of the users 18. For example, the image may be a target and when interacted with, regardless of which user completes the interaction, the target may disappear and/or be replaced by another particular image (e.g., the same image). In this case, the interaction may or may not affect or change the information related to the users 18.

Figure 4:
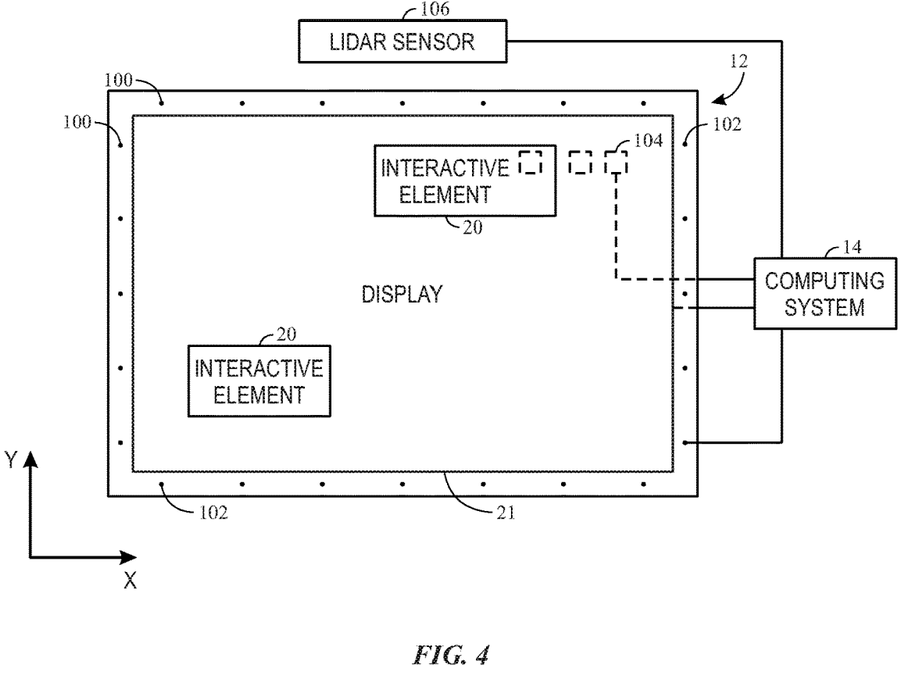
FIG. 4 is a schematic diagram of a sensor system that may be used in the interactive system of FIG. 1, in accordance with an aspect of the present disclosure.

FIG. 4 is a front view of an embodiment of the sensor system 12. FIG. 4 illustrates multiple sensor elements that may detect an interaction with the interactive elements 20. In one embodiment, the sensor system 12 includes one or more optical emitters 100 (e.g., light emitting diodes [LEDs], lasers) that may emit light, and corresponding optical detectors 102 (e.g., photodetectors). As shown, in one embodiment, the optical emitters 100 and optical detectors 102 may be positioned around a perimeter of the display 21. In one embodiment, each optical emitter 100 is opposed to (e.g., aligned directly across from) a corresponding optical detector 102, such that the optical emitter 100 emits light towards the corresponding optical detector 102. In one embodiment, the optical detector 102 detects the light emitted by the optical emitter 100 as long as there is no object positioned between the optical detector 102 and the optical emitter 100. However, when an object interferes with or blocks the light emitted from the optical emitter 100 from reaching the optical detector 102 (e.g., the user 18 reaches a hand to interact with the interactive element 20 on the display 21), the optical detector 102 does not detect the emitted light and sends a signal indicating that the optical detector 102 did not detect the emitted light to the computing system 14. With the optical emitters 100 and the optical detectors 102 positioned about the perimeter of the display 21, as shown, the computing system 14 may process signals from the optical detectors 102 to determine the location of the interaction relative to the interactive elements 20 and/or the display 21 (e.g., along an X axis and a Y axis).

In one embodiment, the optical emitter 100 and the optical detector 102 may be located within a common housing or positioned to enable the optical detector 102 to detect reflected light. In some such cases, light emitted by the optical emitter 100 may be reflected by an object (e.g., a hand of the user 18) toward the optical detector 102, which may then detect the reflected light and provide a signal, indicating that the optical detector 102 detected the emitted light, to the computing system 14. In this manner, the sensor system 12 may provide the signals indicative of the occurrence of interactions with the interactive elements 20.

Additionally or alternatively, the sensor system 12 may include multiple RFID readers 10, such as NFC readers 104 or any of a variety of other readers (e.g., UHF readers), to detect interactions with the interactive elements 20. In one embodiment, the NFC readers 104 may be located on the rearward side of the display 21 (i.e., the opposite side of the forward side of the display 21 that is visible to the user 18). In one embodiment, the NFC readers 104 are arranged in a grid (e.g., a series of rows and columns). As such, when the user 18 reaches forward to interact with the interactive element 20, the NFC readers 104 may read an NFC RFID tag located on the wearable device 16. As discussed above with respect to FIGS. 1-3, the RFID tag 50 may include the NFC RFID tag. In one embodiment, the NFC readers 104 may receive identity information from the NFC RFID tag, which may be provided to the computing system 14 to facilitate matching the interaction to the user 18.

Additionally or alternatively, the sensor system 12 may include a light detection and ranging (LIDAR) system. The LIDAR system may contain at least one LIDAR sensor 106 disposed proximate to the display 21. In operation, the LIDAR sensor 106 continuously sends light (e.g., laser light), such that the LIDAR sensor 106 covers the display 21 in a layer of light. When the emitted light hits an object in its path, the light reflects back to the LIDAR sensor 106, and the LIDAR sensor 106 may determine how far away the object is. For example, when the user 18 reaches out to interact with the interactive element 20 on the display 21, the user's hand interferes with the light emitted by the LIDAR sensor 106, and the LIDAR sensor 106 will detect the interference and determine the location of interference. The LIDAR sensor 106 may then transmit a signal that indicates the location of the interference to the computing system 14 for further processing.

Additionally or alternatively, the sensor system 12 may include a touchscreen, such as resistive touchscreen panel, a capacitive touchscreen panel, a surface acoustic wave panel, or any combination thereof. The touchscreen may sense an interaction performed on the display 21 (e.g., with contact force or electrical charge), and the location of the interaction may be determined based on the position of the sensed interaction. The touchscreen may then send a signal that indicates the location of the sensed interaction to the computer system 14. It should be appreciated that the display 21 may be or include one or more touchscreen displays that may display the interactive elements 20 and detect the interactions with the interactive elements 20.

It should be appreciated that the sensor system 12 may additionally or alternatively include other elements that may detect an interaction, such as pressure pads, switches, or cameras. It should also be appreciated that the sensor system 12 may include any combination of the aforementioned elements, or any other suitable element not already mentioned, to use for sensing an interaction and its location.

Figure 5:
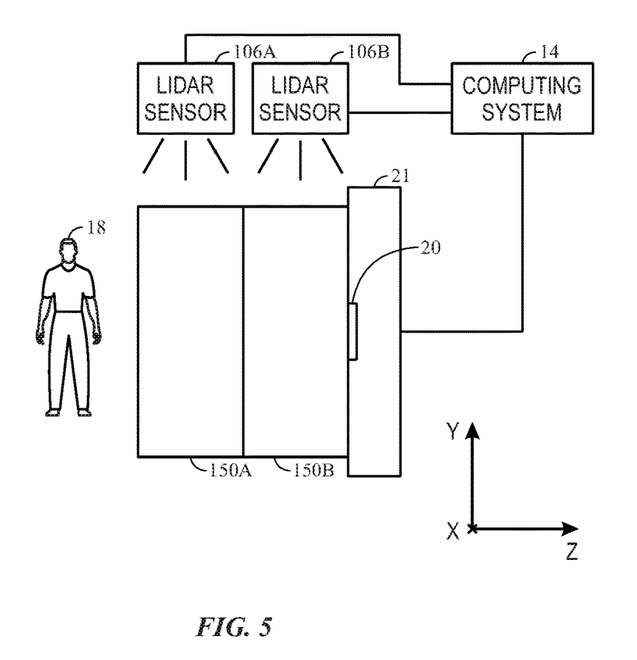
FIG. 5 is a schematic diagram of a sensor system that may be used with the interactive system of FIG. 1 to detect a depth of a user's interaction, in accordance with an aspect of the present disclosure.

FIG. 5 illustrates an embodiment of the sensor system 12 that may detect additional characteristics (e.g., depth along a Z axis) of an interaction. The illustrated sensor system 12 of FIG. 5 includes a layered LIDAR system. However, it should be appreciated that the sensor system 12 may include multiple layers (e.g., along the Z axis) of optical emitters 100 and optical detectors 102 arranged about the display 21 in a manner similar to that of FIG. 4. In FIG. 5, there are two LIDAR sensors 106A and 106B. As shown, the LIDAR sensor 106A is located more forward (i.e., toward the user 18) than the LIDAR sensor 106B, such that the LIDAR sensor 106A creates a light layer 150A closer to the user 18 than a light layer 150B created by the LIDAR sensor 106B in front of the display 21. In this manner, the LIDAR sensor 106A may detect an interfering object (e.g., the user's hand) without the LIDAR sensor 106B detecting the interfering object. The computing system 14 may process the signals sent by the LIDAR sensors 106A, 106B to determine the approximate depth of an interaction. For example, if both the LIDAR sensors 106A, 106B detect the object, the computing system 14 may determine that the user 18 fully or successfully interacted (e.g., contacted or touched) with the interactive element 20 on the display 21. However, if only one LIDAR sensor 106A detects the object, the computing system 14 may determine that the user 18 did not fully interact with the interactive element 20. Furthermore, while FIG. 5 depicts two LIDAR sensors 106A, 106B, there may be any suitable number of LIDAR systems and corresponding light layers to enable sensing a depth of the interaction.

In one embodiment, the sensor system 12 may be used to detect a position of the user 18. For example, additional LIDAR sensors 106 may be placed to detect location of the user 18 in the interactive system 8 (e.g., location within a room or area). That is, the presence of the user 18 may interfere with the emitted light of one or more of the LIDAR sensors 106. The one or more LIDAR sensors 106 may then transmit information regarding the interference to the computing system 14 to determine the position of the user 18. The signals received from the LIDAR sensors 106 may then be combined with signals received from the RFID reader 10 to determine the identity of the user 18.

Furthermore, in one embodiment, the sensor system 12 may be configured to detect skeletal movement and gestures of the user 18. For example, the sensor system 12 may include multiple imaging devices (e.g., cameras), and images obtained by the imaging devices may be processed (e.g., by the computing system 14 using image processing algorithms) to determine skeletal movements and gestures (e.g., hand waving, jumping, dancing, reaching toward the interactive element 20) of the user 18. In one embodiment, the imaging devices may be positioned relative to the display 21 to enable the cameras to detect the user 18 reaching toward the interactive element 20, thereby enabling the determination of the occurrence of the interaction and/or the depth of the interaction. If images obtained by the imaging devices indicate that the user 18 interacted with the interactive element 20 at a certain depth (e.g., extended their arm to a region substantially proximate to the display 21), then the computing system 14 may determine that an interaction occurred, and in response, update the profile of the user 18 and/or the interactive element 20. However, if images obtained by the imaging devices indicate that the user 18 did not adequately interact with the interactive element 20 (e.g., the interaction is not at the appropriate depth), the computing system 14 may not update the profile of the user 18 and/or the interactive element 20. Thus, the sensor system 12 may include any of a variety of elements (e.g., optical emitters 100, optical detectors 102, LIDAR sensors 106, cameras) configured to detect an interaction, a depth of the interaction, a position of a user, and/or gestures made by the user, for example.

It should be appreciated that the various features of the interactive system 8, such as the sensor system 12, may be wirelessly coupled to computing system 14. For example, the sensor system 12 may not be confined to or fixed within a room or area. In one embodiment, the sensor system 12 may be placed on a moving vehicle (e.g., an amusement park ride). The sensor system 12 may detect if user 18 is on the ride, detect interactions completed during the ride (e.g., as a ride vehicle travels along a path), and update the database 22 and/or the interactive elements 20 accordingly. In one embodiment, the sensor system 12 may be placed on a person or an animated character and may detect interactions with the person or the animated character. In this manner, the sensor system 12 may be placed anywhere in the park and is not fixed to a stationary object.

Figure 6:
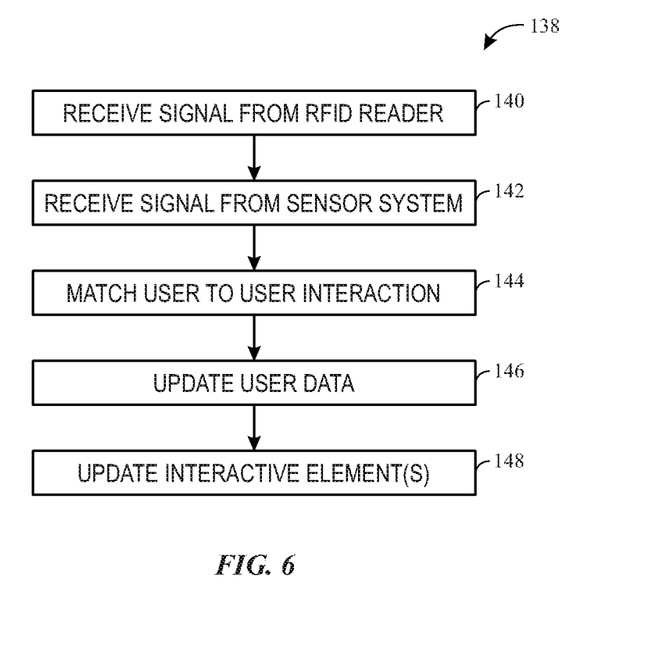
FIG. 6 is a flow diagram of a method of operating the interactive system of FIG. 1, in accordance with an aspect of the present disclosure.

FIG. 6 illustrates a flow chart of a method 138 that may be carried out by the processor 26 to track performance of the users 18, update data in the databases 22, and/or update the interactive elements 20 to provide a unique personalized experience for the users 18. The method 138 disclosed herein includes various steps represented by blocks. It should be noted that at least some steps of the method 138 may be performed as an automated procedure by a system, such as the interactive system 8. Although the flow chart illustrates the steps in a certain sequence, it should be understood that the steps may be performed in any suitable order and certain steps may be carried out simultaneously, where appropriate. Additionally, steps may be added to or omitted from of the method 138. Further, certain steps or portions of the method 138 may be performed by separate devices. For example, a first portion of a method 138 may be performed by the processor 26 of the computing system 14, while a second portion of the method 138 may be performed by a separate processing device. In addition, insofar as steps of the method 138 disclosed herein are applied to received signals, it should be understood that the received signals may be raw signals or processed signals. That is, the method 138 may be applied to an output of the received signals.

In block 140, the processor 26 receives a signal from the RFID reader 10. The signal provides information read from the RFID tag 50 corresponding to the user 18, which the processor 26 uses to determine the identification of RFID tag 50 and/or to access the corresponding data from the databases 22. The processor 26 may also determine the location of RFID tag 50 relative to the RFID reader 10, the interactive element 20, and/or the display 21 using the signal received from the RFID reader 10.

In block 142, the processor 26 receives a signal from the sensor system 12 indicative of the occurrence of an interaction with the interactive element 20. The signal may indicate the location of the interaction relative to the interactive element 20. Based at least in part on the location of the interaction and the location of the RFID tag 50, the processor 26 may match the interaction to the corresponding RFID tag 50, and thus, to its corresponding user 18, in block 144.

In block 146, the processor 26 updates the databases 22 based on the interaction by the user 18. For example, the processor 26 may update the databases 22 to include additional points, record the interaction as complete, or the like. In block 148, the processor 26 may update the interactive element 20 as a result of matching the interaction to the corresponding RFID tag 50, and thus, to its associated user 18. The interactive element 20 may be updated in a user-specific manner, such that the next interactive element 20 is selected and presented to the user 18 based on the corresponding information that is specific to the RFID tag 50 and the user 18, for example. The method 138 may be performed in response to any number of interactions by any number of users 18. Further, if multiple users 18 interact with multiple interactive elements 20 simultaneously, the processor 26 may perform the method 138 multiple times simultaneously.

As set forth above, embodiments of the present disclosure describe an interactive system that uses an RFID reader, a sensor system, and a computing system to determine location and identification of an RFID tag. Further, the system detects an interaction performed by a user associated with the RFID tag. The interactive system stores information related to the RFID tag in one or more databases, which dynamically changes based at least in part on the user's interactions, preferences, performances, or any combination thereof. The computing system updates elements of the interactive system to reflect the information and enhance each user's experience.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
a radio-frequency identification (RFID) reader configured to read data stored on an RFID tag associated with a user and to generate a first signal indicative of the data and indicative of a first location of the RFID tag;
a sensor system configured to detect a user interaction with an interactive element and to generate a second signal indicative of the user interaction and a second location related to the interactive element; and
a processor configured to:
match the user to the user interaction based on a correspondence between the first location indicated by the first signal and the second location indicated by the second signal; and
update a user database to reflect that the user is matched to the user interaction.

2. The system of claim 1, wherein the interactive element comprises a display configured to display an image, and the processor is configured to render another image for presentation on the display in response to matching the user to the user interaction.

3. The system of claim 1, wherein the RFID reader is an ultra-high frequency RFID reader.

4. The system of claim 1, wherein the RFID reader is configured to generate a third signal indicative of a strength of an RFID signal transmitted from the RFID tag to the RFID reader, and the processor is configured to match the user to the user interaction based on the third signal.

5. The system of claim 1, wherein the sensor system comprises one or more optical detectors.

6. The system of claim 1, wherein the sensor system comprises multiple optical detectors positioned about a perimeter of a display that is configured to display the first interactive element.

7. The system of claim 1, wherein the sensor system comprises multiple near-field communication readers.

8. The system of claim 1, wherein the sensor system comprises a light detection and ranging (LIDAR) system.

9. The system of claim 1, wherein the sensor system comprises a resistive touchscreen panel, a capacitive touchscreen panel, a surface acoustic wave panel, or any combination thereof.

10. The system of claim 1, wherein the RFID reader is configured to read respective data stored on an additional RFID tag associated with an additional user and to generate a third signal indicative of the respective data and indicative of a third location of the additional RFID tag, the sensor system is configured to detect an additional user interaction with an additional interactive element and to generate a fourth signal indicative of the additional user interaction and a fourth location related to the additional interactive element, and the processor is configured to:
- match the additional user to the additional user interaction based on a correspondence between the third location indicated by the third signal and the fourth location indicated by the fourth signal; and
- update the user database to reflect that the additional user is matched to the additional user interaction.

11. The system of claim 10, wherein the sensor system is configured to match the user to the user interaction and to match the additional user to the additional user interaction when the user interaction and the additional user interaction occur substantially simultaneously.

12. The system of claim 1, comprising one or more additional RFID readers configured to read data stored on the RFID tag and to generate one or more additional signals indicative of a respective strength of respective RFID signals transmitted from the RFID tag to the one or more additional RFID readers, wherein the processor is configured to determine a location of the RFID tag relative to the interactive element based on the first signal and the one or more additional signals.

13. A system, comprising:
- a radio-frequency identification device (RFID) reader configured to read data stored on one or more RFID tags associated with one or more respective users;
- a sensor system configured to detect a first user interaction at a first location on a display and a second user interaction at a second location on the display; and
- a processor configured to receive RFID signals indicative of the data from the RFID reader and to receive sensor signals indicative of the first user interaction and the second user interaction from the sensor system, wherein the processor is configured to render a first image for display at the first location on the display based on the sensor signals and the RFID reader reading data stored on a first RFID tag of the one or more RFID tags, and wherein the processor is configured to render a second image for display at the second location on the display based on the sensor signals and the RFID reader reading data stored on a second RFID tag of the one or more RFID tags.

14. The system of claim 13, wherein the processor is configured to match a first user of the one or more respective users to the first user interaction based on the RFID signals and the sensor signals and to update a user database to reflect that the first user of the one or more respective users is matched to the first user interaction.

15. The system of claim 13, wherein the RFID signals are indicative of a respective location of each of the one or more RFID tags.

16. A method, comprising:
- receiving, at a processor, a first signal from a radio-frequency identification device (RFID) reader, wherein the first signal is indicative of data stored on an RFID tag and indicative of a first location of the RFID tag associated with a user and read by the RFID reader;
- receiving, at the processor, a second signal from a sensor system, wherein the second signal is indicative of a user interaction with an interactive element and a second location associated with the interactive element;
- matching, using the processor, the user to the user interaction based on the first location indicated by the first signal and the second location indicated by the second signal; and
- updating, using the processor, a user database to reflect that the user is matched to the user interaction.

17. The method of claim 16, comprising rendering, using the processor, an image for display on a display in response to the matching of the user to the user interaction.

18. The method of claim 16, comprising:
- detecting, using the sensor system, an interruption in light emitted by a light emitting element; and
- generating, using the sensor system, the second signal in response to the interruption in light.

19. The method of claim 16, comprising:
- receiving, at the processor, a third signal from the RFID reader, wherein the third signal is indicative of respective data stored on an additional RFID tag and indicative of a third location of the additional RFID tag associated with an additional user and read by the RFID reader;
- receiving, at the processor, a fourth signal from the sensor system, wherein the fourth signal is indicative of an additional user interaction with an additional interactive element and a fourth location associated with the additional interactive element;
- matching, using the processor, the additional user to the additional user interaction based on the third location indicated by the third signal and the fourth location indicated by the fourth signal; and
- updating, using the processor, the user database to reflect that the additional user is matched to the additional user interaction.

20. The method of claim 16, comprising:
- receiving, at the processor, one or more additional signals from one or more additional RFID readers configured to read data stored on the RFID tag; and
- determining, using the processor, a location of the RFID tag relative to the interactive element based on the first signal and the one or more additional signals to facilitate matching the user to the user interaction.

* * * * *